Figure 1:
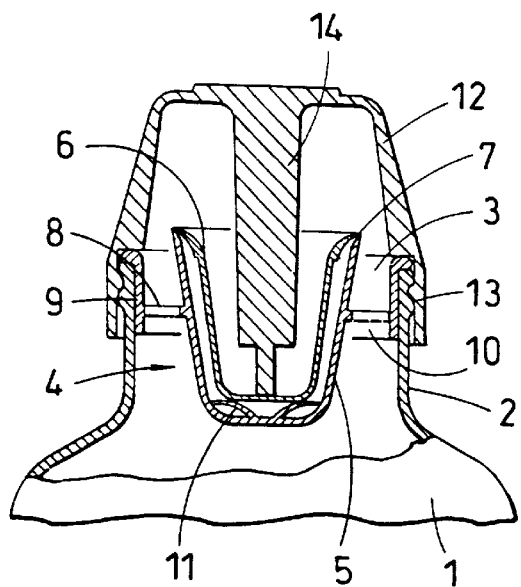

United States Patent [19]
Flewitt

[11] Patent Number: 5,927,354
[45] Date of Patent: Jul. 27, 1999

[54] CONTAINER

[75] Inventor: Harry Flewitt, Farnham, United Kingdom

[73] Assignee: Smithkline Beecham P.L.C., Brentford, United Kingdom

[21] Appl. No.: 08/952,773

[22] PCT Filed: May 24, 1996

[86] PCT No.: PCT/EP96/02277

§ 371 Date: Mar. 18, 1998

§ 102(e) Date: Mar. 18, 1998

[87] PCT Pub. No.: WO96/37757

PCT Pub. Date: Nov. 28, 1996

[30] Foreign Application Priority Data

May 25, 1995 [GB] United Kingdom .................... 9510652

[51] Int. Cl.⁶ ................................................. B65B 1/04
[52] U.S. Cl. ........................ 141/381; 141/322; 222/205
[58] Field of Search .................... 141/379, 380, 141/381, 112, 319–322; 222/205, 179.5, 454

[56] References Cited

U.S. PATENT DOCUMENTS

| | | |
|---|---|---|
| 1,966,754 | 7/1934 | Dennis et al. ............................ 222/454 |
| 2,446,085 | 7/1948 | Gronemeyer et al. . |
| 2,768,660 | 10/1956 | Russell . |
| 2,803,270 | 8/1957 | Carbone, Jr. ............................. 141/380 |
| 3,043,483 | 7/1962 | Vogt ........................................ 141/322 |
| 4,159,791 | 7/1979 | Crutcher ................................. 222/454 |
| 4,319,614 | 3/1982 | Boice ...................................... 141/381 |

FOREIGN PATENT DOCUMENTS 2669007  5/1992  France .

*Primary Examiner*—Steven O. Douglas
*Attorney, Agent, or Firm*—Janice E. Williams; Charles M. Kinzig

[57] ABSTRACT

A dispenser for pourable fluids comprising a container for fluid, in the neck of the container there being a holder for a drinking cup, at least one passage in the neck allowing fluid to pass from the container along the neck past the holder toward the mouth opening, removeably mounted in the holder a drinking cup, having an open top, a removeable closure for the mouth opening, such that inversion or agitation of the dispenser causes fluid to pass from the container through the passages(s) into the drinking cup, and re-inversion or cessation of agitation, to an upright orientation results in the retention of a volume of the fluid in the drinking cup.

6 Claims, 2 Drawing Sheets

CONTAINER

This invention relates to a novel device, being a dispenser for fluids, particularly liquids.

It is frequently necessary to dispense accurate unit volumes of fluids, (which term as used herein includes liquids, which may range from highly mobile liquids to viscous but pourable liquids) from containers, in accurate unit doses. Particular examples of such fluids include pharmaceutical formulations such as solutions or suspensions of medicaments for oral dosing. For example paediatric oral formulations are often provided in the form of syrups. It is particularly important to achieve accurate volumetric dosing of such formulations to ensure that the dose administered is neither too little for efficacy, nor greater than the safe dose.

It is an object of this invention to provide a dispenser which can accurately dispense a dose of a pourable fluid having a consistent predetermined volume. Other objects and advantages of the invention will be apparent from the following description.

According to this invention a dispenser for pourable fluids comprises:

a container for a bulk of the fluid having an upwardly extending neck terminating in a mouth opening, in the neck of the container there being a holder for a drinking cup, there being at least one passage in the neck allowing fluid to pass from the container along the neck past the holder toward the mouth opening, removeably mounted in the holder there being a drinking cup, having an open top facing generally in the same direction as the mouth opening, a removeable fluid-tight closure for the mouth opening, constructed such that inversion or agitation of the dispenser causes fluid to pass from the container through the passage(s) toward and into the drinking cup, and respective re-inversion or cessation of agitation, and return to an upright orientation results in the retention of a predetermined volume of the fluid in the drinking cup.

The fluid is suitably a pharmaceutical product such as an orally administered medicament such a solution or suspension of a medicament, or may be a mouthwash etc. The fluid may be an aqueous solution or suspension, having a viscosity and mobility similar to that of water itself, or may be a viscous but pourable fluid such as a syrup.

The container body may suitably be a bottle or jar, having a neck and mouth opening of a suitable width, e.g. diameter, to accommodate a drinking cup of a suitable volume in the holder. The container body may suitably be made of materials conventional in the art, such as glass or plastics materials.

The holder may comprise a plastics material frame, which may be integral with a plastics container body. Alternatively the holder may comprise a diaphragm or bulkhead across the neck, which again may be integral with the body. Alternatively the holder may be a separate member from the container body and may be retained in the neck by for example a wedge fit, friction fit, snap fit or screw fit etc. The holder may suitably be located in the neck, at or shortly upstream of the mouth opening.

Suitably the holder may comprise a receptacle into which the drinking cup may fit. Such a receptacle may be retained in the neck by ribs extending, e.g. radiating, from the outer periphery of the receptacle toward the neck of the container body. The space(s) between the ribs, and/or between the receptacle and the neck, may suitably comprise the passage(s). Alternatively the receptacle may be integrally formed with the above described diaphragm or bulkhead, with apertures in the diaphragm or bulkhead comprising passages allowing fluid to pass through. Alternatively the receptacle may be mounted to one side of the neck, thereby leaving a passage between the receptacle and the inner neck wall on the other side.

In a preferred embodiment the receptacle may itself be in the form of a cup (herein termed the "receptacle cup" to distinguish it from the drinking cup), into which the drinking cup fits. For example the receptacle cup may correspond generally in shape to the lower part of the drinking cup. In this embodiment the upper outer part, e.g. the rim, of the drinking cup preferably fits into the upper part of the receptacle cup, so as to form a substantially fluid tight seal between the drinking and receptacle cups. This provides the advantage that when the container is inverted or agitated during use (or otherwise) fluid cannot easily penetrate between the drinking and receptacle cups, and thereby contaminate the outside of the drinking cup, which is normally handled by the user. Paediatric syrup formulations for example can be very sticky, and contamination of the outer surface of the drinking cup with such can be unpleasant for the user.

The drinking cup should hold at least the predetermined volume of the fluid which is to be dispensed. The drinking cup may conveniently be made of a plastics material and be of a shape and size convenient for holding by the user. The drinking cup may simply sit in the holder and may be a snug removeable fit in the holder, for example forming the substantially fluid tight seal with a receptacle cup mentioned above.

The fluid tight closure may suitably be a cap fitting over the mouth opening, and removeably retained thereon by a conventional friction, screw fit or snap-fit action. The closure may be made of plastics materials conventional in the art. There is suitably a space between the closure and the drinking cup so that fluid can pass from the container through the passage(s) toward and into the drinking cup. For example the closure may form a dome like strucure over the mouth opening.

In a preferred embodiment when the closure is in place on the mouth it exerts pressure upon the drinking cup to retain it in the holder whilst the dispenser is inverted or agitated as described above. The closure may therefore have one or more parts which come into contact with the drinking cup when the closure is in place so as to achieve this.

In a preferred embodiment the said one or more parts which come into contact with the drinking cup when the closure is in place may comprise a plunger which extends from the closure into the drinking cup to contact the inner bottom of the drinking cup. A plunger of this type provides the further advantage that if the drinking cup fills to its brim as a consequence of the reinversion or cessation of agitation, the removal of the closure from the filled drinking cup correspondingly causes the plunger to be withdrawn from the drinking cup. This causes the fluid surface to drop as a consequence of the displaced volume such that the drinking cup is no longer brim-full, and the risk of spillage is reduced. The plunger may be integral with the closure, for example in the form of a cylinder.

Suitably the drinking cup fits into the holder against a resilient action urging the drinking cup out of the holder so that in the above-described preferred embodiment the closure exerts its pressure on the drinking cup against this resilience. This may also provide the advantage that when the closure is removed to open the dispenser the drinking cup springs up under the resilient action raising the drinking cup in the mouth of the container to make it more accessible to the user. For example when the holder is the above-described receptacle cup there may be a resilient member at the bottom of the receptacle cup, e.g. one or more plastics material spring leaves, integral with the receptacle cup.

In another preferred embodiment, the holder may be so constructed that the holder holds the drinking cup in a tilted orientation relative to the upright orientation of the container, and when the closure is removed the drinking cup adopts an upright orientation, preferably urged into this upright orientation by the said resilient action. If the closure exerts pressure upon the drinking cup to retain it in the holder whilst the dispenser is inverted or agitated as described above it may bear upon the drinking cup to urge the drinking cup into this tilted orientation.

For example the axis between the bottom and the open top of the retained drinking cup may be at an angle between 1° and 45° to the longitudinal axis between the base of the container and the mouth opening. The holder may for example include surfaces which engage with the drinking cup and which cause such a tilted orientation. In this embodiment the tilted orientation of the drinking cup whilst the closure is in place prevents complete filling of the drinking cup, and can thereby ensure that the drinking cup does not become so full of fluid that when it returns to its upright orientation it is brim full of fluid. This reduces the possibility of spillage during use.

The invention will now be described by way of non-limiting example only with reference to accompanying FIGS. 1, 2, 3 and 4 which show cross sectional views of the neck and mouth region of one version of a dispenser of this invention, and FIGS. 5 and 6 which show cross sectional views of another version.

Referring to FIGS. 1 to 4, a dispenser of this invention comprises a container 1 in the form of a bottle capable of standing upright upon its flat base (not shown). The container 1 has an upwardly extending neck 2, which terminates in a mouth opening 3. In the neck 2 there is a holder 4 (generally) in the form of a receptacle cup 5 for a drinking cup 6. The receptacle cup 5 generally corresponds in shape to the lower part of the drinking cup 6, and holds the drinking cup 6 securely but releasably in an orientation with the open top of the drinking cup 6 facing generally in the same direction as the mouth opening 3. The upper outer rim 7 of the drinking cup 6 rests against a corresponding inner rim part of the receptacle 5, so as to form a substantially fluid-tight seal between the drinking cup 7 and the receptacle cup 6.

Radiating from the receptacle cup 5 toward the walls of the neck 2 are ribs 8, which link the receptacle 5 with a fitment 9 which wedges in the neck 2. The spaces 10 between the ribs 8 and between the receptacle cup 5 and the neck 2 define passages which during use allow fluid to pass from the container 1 along the neck 2 toward the mouth opening 3.

In the lower part of the receptacle cup 5 are leaf springs 11 which exert a resilient action against the drinking cup 6, urging it out of the receptacle 5.

Over the mouth opening 3 is a removeable closure 12 which is retained upon the neck 2 by a screw fit 13. Extending downwardly from the closure 12 is a plunger 14 which contacts the inner bottom of the drinking cup 6 when the closure 12 is in place on neck 2. The plunger 14 urges the drinking cup 6 downwards into the receptacle against the resilience of the springs 11, and urges the upper outer rim 7 of the drinking cup 6 against the corresponding part of the receptacle cup 5.

Figure 2:
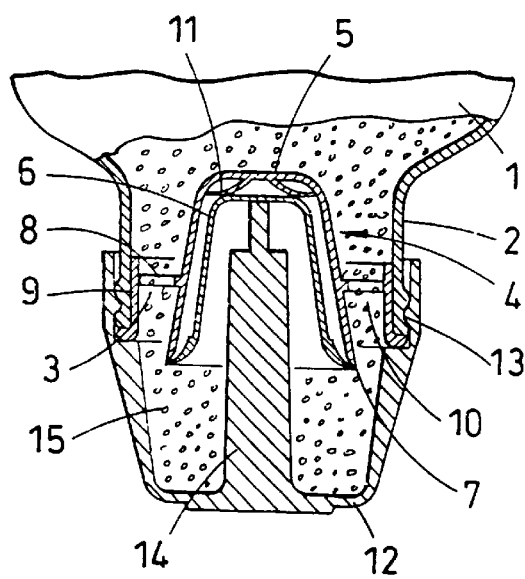
Figure 3:
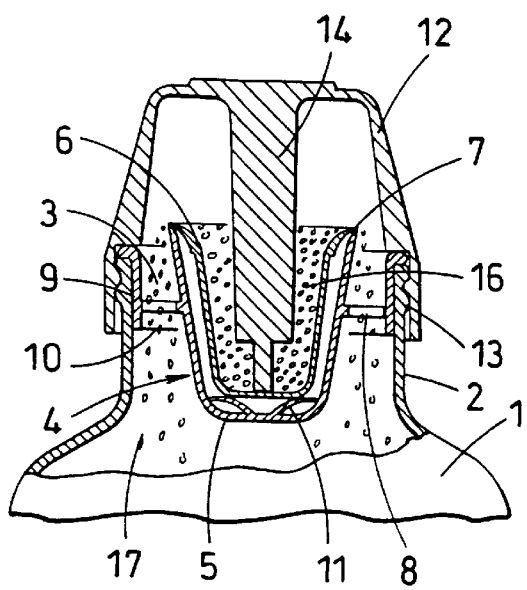

The sequence of operation of the dispenser is shown through FIGS. 1 to 4. Referring to FIG. 2, the dispenser of FIG. 1 is inverted. Fluid 15 flows from the container 1 through the passages 10 toward the mouth opening 3, and into the closure 12. On reinversion of the dispenser as shown in FIG. 3, fluid 16 fills the drinking cup 6, and excess fluid 17 drains back into the container 1, through the passages 10. The contact between the upper outer rim 7 of the drinking cup 6 against the corresponding part of the receptacle cup 5 creates a substantially fluid tight seal preventing fluid 15 from contacting the outer surface of the drinking cup 6 and making it wet and/or sticky. Alternatively drain holes (not shown) may be provided in the base of the receptacle 5 for excess fluid to drain through back into the container.

Figure 4:
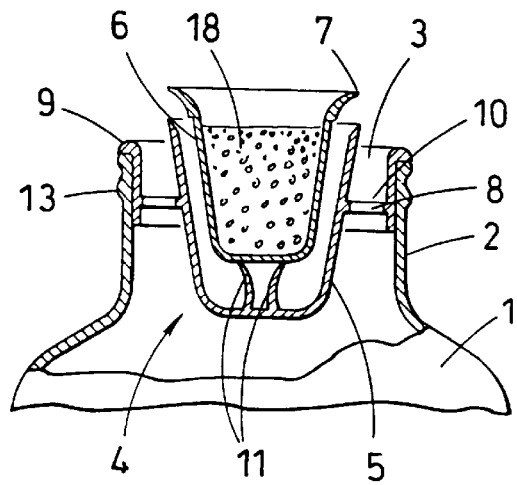

When the closure 12 is removed, as shown in FIG. 4, the removal of the plunger 14 from the drinking cup 6 causes the fluid 18 level in the drinking cup 6 to drop below the rim 7 of the drinking cup, and also causes the drinking cup 6 to spring upward under the resilient action of the springs 11 slightly out of the receptacle cup 5, rendering the drinking cup 6 easier for the user to grasp and remove for use.

After use, the drinking cup 6 is returned into the receptacle cup 5, and the closure 12 is returned into place on neck 2 to restore the configuration shown in FIG. 1, and the dispenser is ready for use in another sequence as described above.

Figure 5:
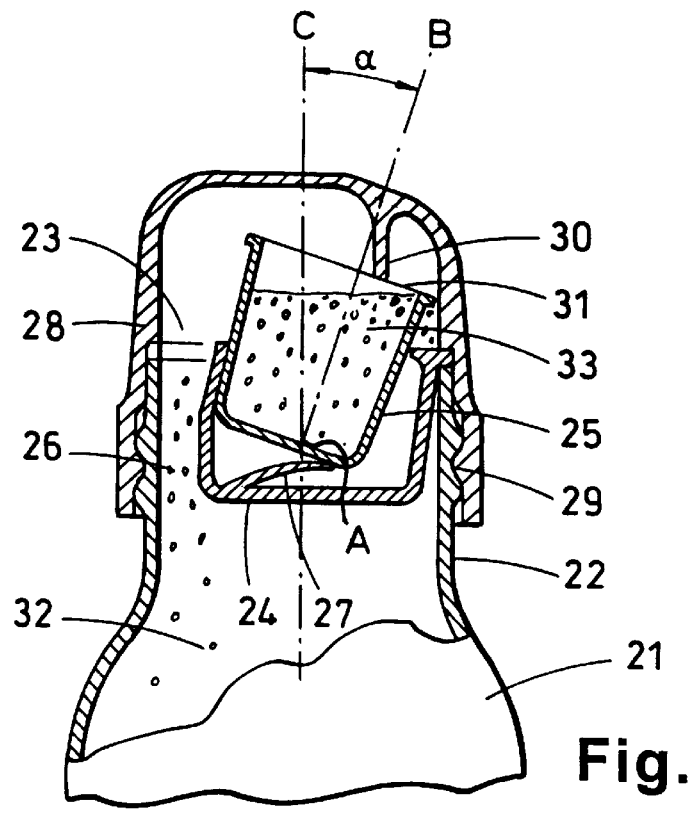
Figure 6:
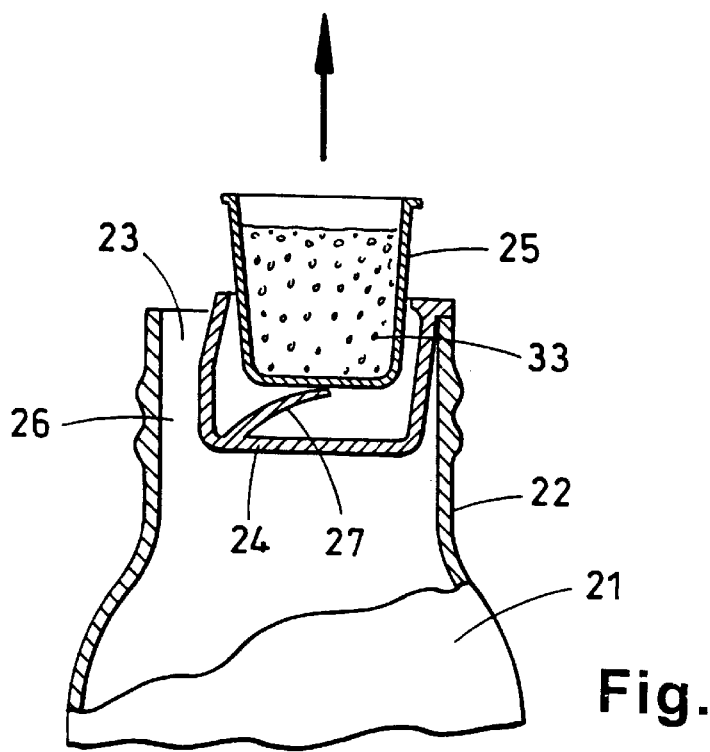

Referring to FIGS. 5 and 6, a second version of dispenser of this invention comprises a container 21 in the form of a bottle capable of standing upright upon its flat base (not shown). The container 21 has an upwardly extending neck 22, which terminates in a mouth opening 23. In the neck 22 there is a holder 24 (generally) in the form of a receptacle cup for a drinking cup 25. The receptacle cup 24 generally corresponds in shape to the lower part of the drinking cup 25 and holds the drinking cup 25 securely but releasably in an orientation in which the axis A–B between the open top of the drinking cup 25 and the bottom of the drinking cup 25 is tilted at an angle $\alpha$ relative to the axis A–C between the mouth opening 23 and the flat base (not shown) of the container 21.

The holder 24 wedges in the neck 22. A space 26 between the holder 24 and the neck 22 defines a passage which during use allows fluid to pass from the container 21 along the neck 22 toward the mouth opening 23.

In the lower part of the holder 24 is a leaf spring 27 which exerts a resilient action against the drinking cup 25, urging it out of the holder 24.

Over the mouth opening 23 is a removeable closure 28 which is retained upon the neck 23 by a screw fit 29. Extending downwardly from the closure 28 is a part 30 which contacts the upper rim 31 of the drinking cup 25 when the closure 28 is in place on neck 22. The part 31 urges the drinking cup 25 downwards against the holder 24 against the resilience of the springs 11, and into the tilted orientation at angle a shown in FIG. 5.

The sequence of operation of the dispenser is shown through FIGS. 5 and 6 and is analogous to the operation of the dispenser of FIGS. 1 to 4. The dispenser of FIG. 5 is inverted, fluid 32 flows from the container 21 through the passage 26 toward the mouth opening 23, and into the closure 28. On reinversion of the dispenser, fluid 33 partly fills the drinking cup 25, and excess fluid 33 drains back into the container 21 through the passage 26.

When the closure 28 is removed, as shown in FIG. 6, the removal of the part 30 causes the drinking cup 25 to spring upward under the resilient action of the spring 27 into an upright orientation as shown in FIG. 6. This change in orientation causes the level of fluid 33 to fall below the rim of the drinking cup 25 so that the drinking cup 25 is not brim-full, therefore reducing the risk of spillage. The drinking cup 25 is also thereby urged slightly out of the holder 24, rendering the drinking cup 25 easier for the user to grasp and remove for use.

After use, the drinking cup 25 is returned into the holder 24, and the closure 28 is returned into place on neck 22 to restore the configuration shown in FIG. 5, and the dispenser is ready for use in another sequence as described above.

The entire dispenser of FIGS. 1 to 6 is made of plastics materials conventional in the art of manufacture of dispensers for fluids such as mouthwashes, oral medicaments etc.

I claim:

1. A dispenser for pourable fluids comprising;

a container for a bulk of the fluid having an upwardly extending neck terminating in a mouth opening, a holder for a drinking cup in the neck of the container, at least one passage in the neck which allows fluid to pass from the container along the neck past the holder toward the mouth opening, a drinking cup removably mounted in the holder, the drinking cup having an open top facing generally in the same direction as the mouth opening, a removable fluid-tight closure for the mouth opening, the closure having a plunger which extends from the closure into the drinking cup to contact the drinking cup when the closure is in place and which exerts pressure upon the drinking cup to retain the drinking cup in the holder when the dispenser is inverted or agitated, constructed such that inversion or agitation of the dispenser causes fluid to pass from the container through at least one passage toward and into the drinking cup, and respective re-inversion or cessation of agitation and return to an upright orientation results in the retention of a predetermined volume of the fluid in the drinking cup.

2. A dispenser according to claim 1 wherein the holder comprises a receptacle in the form of a cup into which the drinking cup fits.

3. A dispenser according to claim 2 wherein the upper outer part of the drinking cup fits into the upper part of the receptacle so as to form a substantially fluid tight seal between the drinking cup and the receptacle.

4. A dispenser according to claim 2 wherein there is a resilient member at the bottom of the holder urging the drinking cup out of the holder.

5. A dispenser for pourable fluids comprising:

a container for a bulk of the fluid having an upwardly extending neck terminating in a mouth opening, a holder for a drinking cup in the neck of the container, at least one passage in the neck which allows fluid to pass from the container along the neck past the holder toward the mouth opening, a drinking cup removably mounted in the holder, the drinking cup having an open top facing generally in the same direction as the mouth opening, a removable fluid-tight closure for the mouth opening, the closure having a part which exerts pressure upon the drinking cup to retain the drinking cup in the holder when the dispenser is inverted or agitated and which causes the drinking cup to be held by the holder in a tilted orientation relative to the upright orientation of the container, such that when the closure is removed the drinking cup adopts an upright orientation, constructed such that inversion or agitation of the dispenser causes fluid to pass from the container through at least one passage toward and into the drinking cup, and respective re-inversion or cessation of agitation and return to an upright orientation results in the retention of a predetermined volume of the fluid in the drinking cup.

6. A dispenser for pourable fluids comprising:

a container for a bulk of the fluid having an upwardly extending neck terminating in a mouth opening, a holder for a drinking cup in the neck of the container, at least one passage in the neck which allows fluid to pass from the container along the neck past the holder toward the mouth opening, a drinking cup removably mounted in the holder, the drinking cup having an open top facing generally in the same direction as the mouth opening, the drinking cup fitting into the holder against a resilient action urging the drinking cup out of the holder, a removable fluid-tight closure for the mouth opening, the closure having a part which exerts pressure upon the drinking cup to retain the drinking cup in the holder when the dispenser is inverted or agitated and which causes the drinking cup to be held by the holder against the resilient action, such that when the closure is removed the drinking cup is urged out of the holder by the resilient action, constructed such that inversion or agitation of the dispenser causes fluid to pass from the container through at least one passage toward and into the drinking cup, and respective re-inversion or cessation of agitation and return to an upright orientation results in the retention of a predetermined volume of the fluid in the drinking cup.

* * * * *